S. HAMMERSCHLAG.
Waxing Paper.
No. 8,460. Reissued Oct. 22, 1878
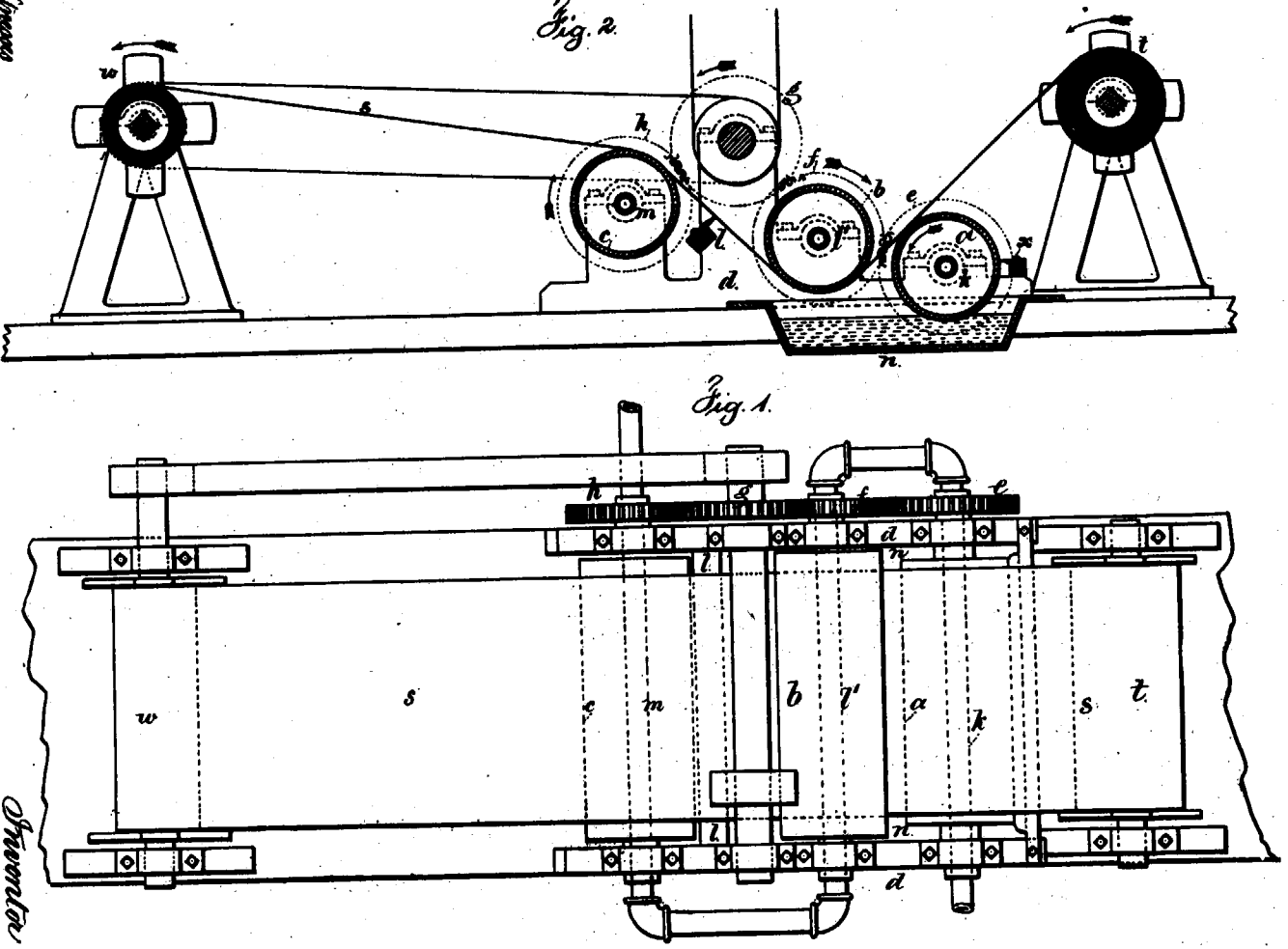
Witnesses
Chas. H. Smith
Geo. T. Pinckney
Inventor
Siegfried Hammerschlag
for Lemuel W. Serrell Atty

UNITED STATES PATENT OFFICE.

SIEGFRIED HAMMERSCHLAG, OF JERSEY CITY, NEW JERSEY.

IMPROVEMENT IN WAXING PAPER.

Specification forming part of Letters Patent No. 193,867, dated August 7, 1877; Reissue No. 8,466, dated October 22, 1878; application filed October 3, 1878.

*To all whom it may concern:*

Be it known that I, SIEGFRIED HAMMERSCHLAG, of Jersey City, in the State of New Jersey, have invented an Improvement in Waxing Paper, of which the following is a specification.

The object of this invention is to apply paraffine or other wax to paper to render the same water-proof. This paper is adapted to confectionery, to prevent the adhesion of articles one to another or to the paper, and the paper may also be used in wrapping butter, cheese, cutlery, and other articles requiring a water-proof protection.

My improvement relates to a means for heating the wax, applying it to the paper, spreading or diffusing the wax into the paper, removing surplus wax, and then polishing the surface prior to winding the paper upon a reel.

In the drawing, Figure 1 is a plan view, and Fig. 2 is a longitudinal section, of the apparatus employed by me.

The cylinders *a b c* are hollow, and their journals are mounted in a suitable frame-work, *d*, and the gear-wheels *e f g h* are employed to give motion to the rollers in the direction indicated by the arrows.

Each cylinder is supplied with steam to heat the same to the desired temperature, as in a calendering-machine. The steam pipes are shown at *k l' m*.

There is a trough, *n*, beneath the cylinder *a*, into which paraffine or other wax is introduced, and the proximity of the rollers *a b* to this trough insures the melting of such wax, and the surface of the cylinder *a* takes up a layer of wax and applies it to the web of paper *s*, that is drawn off the reel *t* and wound upon the reel *w*.

The scraper *x* is applied to the cylinder *a*, between the wax-trough and the place of contact with the paper, to remove surplus wax, and only allow a uniform layer of wax to adhere to the heated cylinder *a*. The paper passes beneath the heated cylinder *b*, with the plain surface of the paper next to the heated cylinder. This serves to heat the paper and melt and diffuse the wax throughout the fabric of the paper, so as to render it thoroughly water-proof. The paper now is drawn over the stationary scraper *l* to remove any surplus paraffine, and then it is brought over the heated cylinder *c* with the waxed surface in contact therewith. By this cylinder *c* the paraffine is again fused and spread into and upon the surface of the paper, thereby ironing and smoothing the wax, and giving to the same a polished and uniform appearance, and the surface of the heated cylinder *c*, by preference, travels in the opposite direction to the paper with which it comes into contact. The paper prepared in this manner is saturated and rendered transparent, or nearly so, by the action of the wax, and it is a new article of manufacture adapted to various uses in the arts, as aforesaid.

I claim as my invention—

1. In a machine for applying wax to the surface of paper, a heated cylinder revolved within the trough containing the wax and acting to heat the wax and apply a layer to a web of paper, substantially as set forth.

2. The method herein specified of applying wax to the surface of paper, consisting in transferring the melted wax from a trough to the paper by a roller, moving the paper in contact with such roller, and removing the surplus wax by a scraper, substantially as set forth.

3. In a machine for applying wax to the surface of paper, the heated cylinders *a* and *b*, in combination with the trough *n* and scraper *l*, and means for supplying paper, whereby the heated wax is applied to one surface of the web of paper by the roller *a*, and afterward the paper is heated at the other surface to draw the wax into the paper, substantially as set forth.

4. The heated cylinders *a b c*, in combination with the trough *n*, the scraper *l*, and mechanism for revolving the cylinder *c* in the opposite direction to the movement of the paper with which it is in contact, substantially as set forth.

5. The method herein set forth of waxing paper, consisting in spreading the wax upon the surface, heating the paper from the opposite side to spread and fuse the wax into the fabric of the paper, removing the surplus wax, and remelting and polishing the wax upon the paper, substantially as set forth.

Signed by me this 1st day of October, A. D. 1878.

SIEGFRIED HAMMERSCHLAG.

Witnesses:

GEO. T. PINCKNEY,
WILLIAM G. MOTT.